Patented Jan. 13, 1942

2,270,220

UNITED STATES PATENT OFFICE 2,270,220

REFRACTORY

Norman Percy Pitt, Eastview, Ontario, Arthur Clarence Halferdahl, Rockcliffe, Ontario, and Frank Eugene Lathe, Ottawa, Ontario, Canada, assignors, by mesne assignments, to Canadian Refractories Limited, Montreal, Quebec, Canada, a corporation of Canada No Drawing. Application April 1, 1937, Serial No. 134,456

8 Claims. (Cl. 106—63)

This invention relates to the production of improved refractories from chrome ores and more particularly to improve chrome refractories in which the silica is combined with lime.

The object of the invention is to provide a relatively cheap chromite refractory of improved physical and chemical properties, which has a higher refractoriness under load than chromite refractories heretofore available, and which is substantially neutral chemically.

In copending application 749,042, filed October 19, 1934, now Patent No. 2,245,297, granted June 10, 1941, for "Refractories" of which the present application is a continuation in part, there is described the balancing of lime and silica in refractories and reference is made to the addition of lime to chrome ores, within a prescribed ratio, to overcome the detrimental effect of silica in the chrome ore.

A typical composition of chrome ores is substantially $SiO_2$ 7.6, $Al_2O_3$ 15.5, $Fe_2O_3$ 19.1, CaO 0.2, MgO 13.9, $Cr_2O_3$ 42.2%, loss on ignition 2.5%. The silica in the ore is usually combined with magnesia as hydrous magnesium silicates. These silicates are deleterious to the chrome ore in that they soften at a relatively low temperature, and cause failure of the refractory.

It has now been found that if lime in well defined proportions, is added to the chrome ore to transform, on burning, all the silica present into dicalcium silicate a much improved product is produced consisting essentially of spinels, dicalcium silicate and normally a relatively small portion of periclase. If the magnesia content of the raw chrome ore or lime-bearing material is relatively high the proportion of periclase in the burned product will be higher. The lime-silica ratio should be such that all hydrous magnesium silicates present as gangue in the chrome ore will be converted into dicalcium silicate and periclase. Excessive lime causes the breakdown of the spinels and reduces the refractoriness of the product. The ratio of lime to silica should not exceed 3.0 should not be less than 1.5.

The lime constituent of the raw mix may be calcareous rock ranging from high-silica limestones to calcareous magnesites, such as for example:

|  | $SiO_2$ | $R_2O_3$ | CaO | MgO | Loss |
|---|---|---|---|---|---|
| High-silica limestone | 5.8 | 0.7 | 51.2 | 1.3 | 41.0 |
| Calcareous magnesite | 1.1 | 0.4 | 10.8 | 44.7 | 43.0 |

The following examples are given of the composition of the raw mixtures used in producing the improved refractory, with the analyses of the corresponding burned products.

|  | $SiO_2$ | $Al_2O_3+Fe_2O_3$ | CaO | MgO | $Cr_2O_3$ |
|---|---|---|---|---|---|
| 72.5% typical chrome ore 27.5% limestone | 8.10 | 28.80 | 16.25 | 11.95 | 34.90 |
| 57.15 low silica chrome ore 48.85 calcareous magnesite | 3.00 | 30.40 | 6.00 | 30.35 | 30.25 |
| 59.4 high silica chrome ore 40.6 limestone | 12.50 | 22.85 | 25.00 | 10.05 | 29.60 |

The chrome ore and the calcareous rock are preferably finely ground and thoroughly mixed before burning. The burning may be done in a rotary kiln or otherwise and preferably at a temperature in excess of 2600° F. When such a mixture of raw materials, having a lime-silica ratio within the limits defined, is burned it is transformed into a product having an unusually high refractoriness under load, a characteristic in which known products of this character are deficient. If the lime and silica are not balanced substantially as described, excess lime attacks the spinels, while with insufficient lime the desired reaction is not complete, and undesirable compounds with low melting-points result. Lime and silica in excess of that naturally contained in the chrome ore and calcareous material may be included in the raw mix to increase the proportion of dicalcium silicate, but the ratio of lime to silica must be maintained. Alumina in excess of substantially 20% is detrimental.

The exact mineralogical composition of the product is difficult of close determination but as indicated above it consists essentially of the spinels of the chrome ore with dicalcium silicate and periclase formed during the burning of the raw mix.

We claim:

1. A method of producing an improved refractory from natural chrome ore which comprises mixing with the chrome ore lime sufficient substantially only to convert free and combined silica in the mixture into dicalcium silicate and burning the mixture at a temperature in excess of 2600° F.

2. A method of producing an improved refractory from natural chrome ore which comprises mixing chrome ore and calcareous material in such proportions as to provide a mixture having a lime to silica ratio of 1.5 to 3.0 and burning the mixture at a temperature in excess of 2600° F.

3. A chrome refractory being the product of the heat treatment of natural chrome ore with lime and consisting of spinels, dicalcium silicate and periclase.

4. A burned refractory material consisting substantially of the undecomposed spinels of natural chrome ore, dicalcium silicate and periclase the dicalcium silicate and the periclase being formed in situ with said undecomposed spinels.

5. A burned chrome ore refractory material consisting of spinels and a matrix formed in the mass and consisting of dicalcium silicate and periclase.

6. A burned chrome ore refractory consisting of the undecomposed spinels of chrome ore as the major constituent and associated therewith dicalcium silicate and periclase.

7. A method of producing an improved refractory from natural chrome ore which comprises mixing chrome ore and calcareous material in such proportions as to provide a mixture having a lime to silica weight ratio of 1.5 to 3.0 and burning the mixture at a temperature in excess of 2600° F.

8. A chrome refractory being the product of the heat treatment of natural chrome ore with lime in which the weight ratio of lime to silica is from 1.5 to 3.0 and consisting substantially of spinels, dicalcium silicate and periclase.

NORMAN PERCY PITT.
ARTHUR CLARENCE HALFERDAHL.
FRANK EUGENE LATHE.